(12) United States Patent
Enomoto et al.

(10) Patent No.: US 7,714,475 B2
(45) Date of Patent: May 11, 2010

(54) MULTIPLE PHASE CLAW POLE TYPE MOTOR

(75) Inventors: Yuji Enomoto, Hitachi (JP); Motoya Ito, Hitachinaka (JP); Kenji Miyata, Hitachinaka (JP); Chio Ishihara, Tokyo (JP); Ryoso Masaki, Hitachi (JP); Yasuaki Motegi, Kiryu (JP); Kouki Isozaki, Kiryu (JP); Tadashi Sato, Nitta (JP)

(73) Assignees: Hitachi Industrial Equipment Systems Co., Ltd., Tokyo (JP); Hitachi Powdered Metals Co., Ltd., Matsudo-shi (JP); Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 11/376,091

(22) Filed: Mar. 16, 2006

(65) Prior Publication Data

US 2006/0208602 A1    Sep. 21, 2006

(30) Foreign Application Priority Data

Mar. 18, 2005    (JP)    ............................. 2005-079282
Mar. 13, 2006    (JP)    ............................. 2006-066882

(51) Int. Cl.
*H02K 21/14*    (2006.01)
*H02K 37/12*    (2006.01)

(52) U.S. Cl. ..................... 310/216.067; 310/49.01; 310/216.066; 310/257; 310/43

(58) Field of Classification Search ............... 310/44, 310/49 R, 216, 257, 156.38, 156.39, 43, 45, 310/216.066–216.067
See application file for complete search history.

(56) References Cited

U.S. PATENT DOCUMENTS 3,549,918 A * 12/1970 Hout et al. ................. 310/49 R
(Continued)

FOREIGN PATENT DOCUMENTS

CN    1457132 A    11/2003
(Continued)

OTHER PUBLICATIONS

Chinese Office Action, JP200610059649.6, dated Jan. 4, 2008.

*Primary Examiner*—Tran Nguyen
(74) *Attorney, Agent, or Firm*—Antonelli, Terry, Stout & Kraus, LLP.

(57) ABSTRACT

In a multiple phase claw pole type motor which includes: a plurality of claw poles including a claw portion extending in an axial direction and having a magnetic pole surface facing a rotor in a state of being separated from the rotor by a small gap, a radial yoke portion extending radially outwardly from this claw portion, and an outer peripheral yoke extending from this radial yoke portion in the same direction as the direction of extension of the claw portion; a stator core formed by alternately placing the claw poles in a circumferential direction so that a distal end of each claw portion faces the outer peripheral yoke of an adjacent one of the claw poles; and a stator constructed by sandwiching an annular coil with the adjacent claw poles of this stator core, a multiple phase claw pole type motor characterized in that the claw poles are formed by compacting a magnetic powder and are formed of a magnetic compact having a DC magnetizing property of its flux density becoming 1.7 teslas or more when 10000 A/m of magnetic field is applied.

12 Claims, 14 Drawing Sheets

U.S. PATENT DOCUMENTS

| | | | |
|---|---|---|---|
| 3,633,055 A | * | 1/1972 | Maier .................... 310/156.26 |
| 4,841,190 A | * | 6/1989 | Matsushita et al. .......... 310/257 |
| 4,942,325 A | * | 7/1990 | Fukaya ..................... 310/257 |
| 5,331,237 A | * | 7/1994 | Ichimura .................... 310/44 |
| 5,364,253 A | * | 11/1994 | Kojima et al. ................ 425/78 |
| 5,598,046 A | * | 1/1997 | Miyazawa et al. ........ 310/49 R |
| 6,259,176 B1 | * | 7/2001 | Isozaki et al. ............ 310/49 R |
| 6,323,569 B1 | * | 11/2001 | Akama ..................... 310/49 R |
| 6,765,321 B2 | * | 7/2004 | Sakamoto ................. 310/49 R |
| 6,903,641 B2 | * | 6/2005 | Kondo et al. ................. 336/83 |
| 6,946,771 B2 | * | 9/2005 | Cros et al. .................. 310/257 |
| 7,135,802 B2 | | 11/2006 | Seki et al. |
| 2004/0061582 A1 | * | 4/2004 | Kondo et al. .................. 336/83 |
| 2005/0012427 A1 | | 1/2005 | Seki et al. |

FOREIGN PATENT DOCUMENTS

| | | | | |
|---|---|---|---|---|
| JP | 59063972 A | * | 4/1984 | |
| JP | 06054511 A | * | 2/1994 | |
| JP | 11-234930 A | | 8/1999 | |
| JP | 11234930 A | * | 8/1999 | |
| JP | 2002329626 A | * | 11/2002 | |
| JP | 2003-333777 | | 11/2003 | |
| JP | 2004-015998 | | 1/2004 | |

\* cited by examiner

COMPARISON BETWEEN B-H CURVES OF VARIOUS MATERIALS

COMPARISON OF DC B–H CURVES OF
VARIOUS MAGNETIC MATERIALS

RESULTS OF COMPUTATION OF
MOTOR OUOTPUT TORQUE

FLUX DENSITY (T) OF CORE
MATERIALS AT 10000A/m

THICKNESS OF CLAW POLES (mm)

FLUX DENSITY (T) OF CORE MATERIALS AT 10000A/m

FIG.7A
FIG.7B
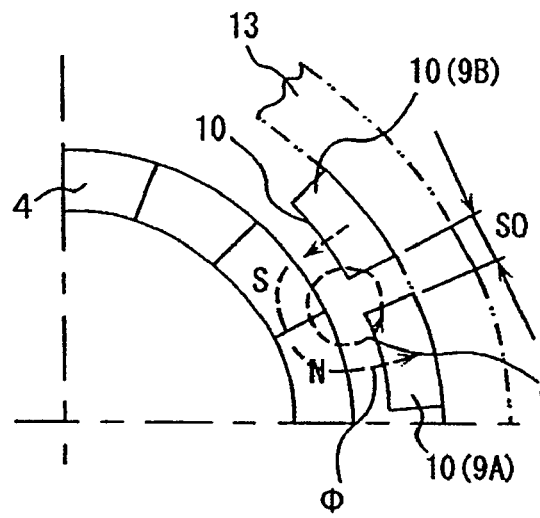
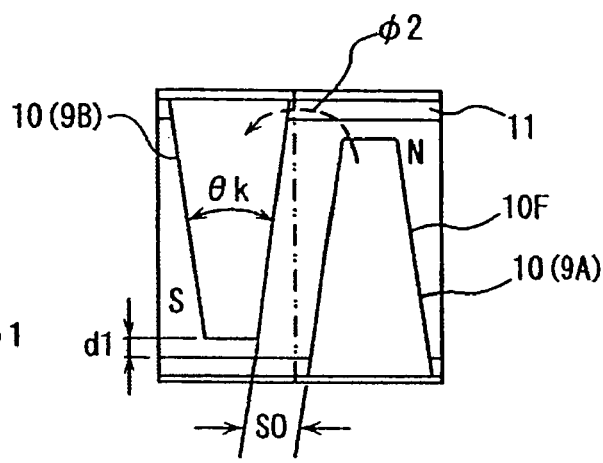
FIG.8
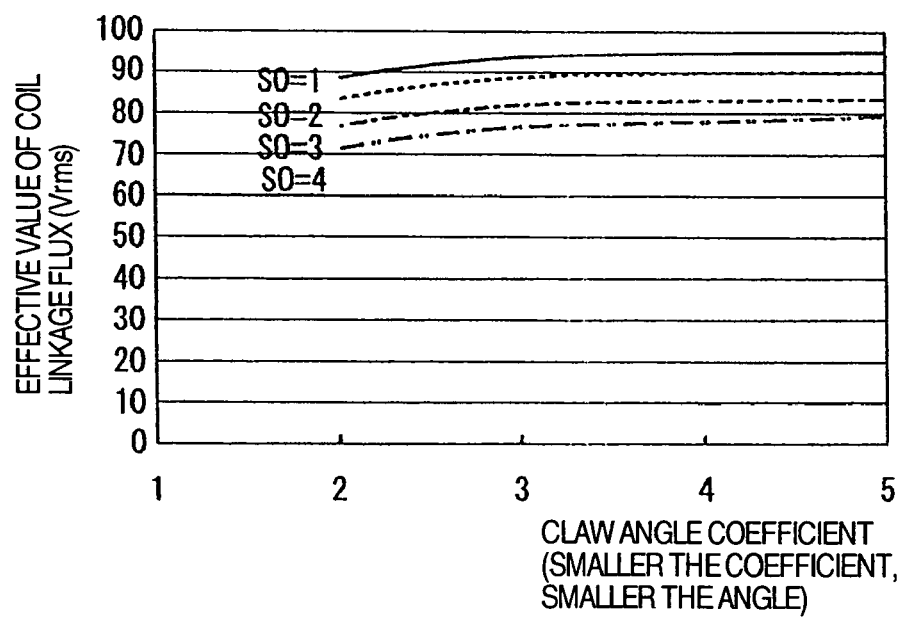
RELATIONSHIP AMONG CLAW WIDTH, ANGLE AND EFFECTIVE VALUE OF INDUCED VOLTAGE

MEASUREMENT OF EFFECTIVE
VALUE OF INDUCED VOLTAGE

VOLTAGE WAVEFORM (250r/min)

VOLTAGE WAVEFORM (1000r/min)

MULTIPLE PHASE CLAW POLE TYPE MOTOR

BACKGROUND OF THE INVENTION

(1) Field of the Invention

The present invention relates to a multiple phase claw pole type motor used in the fields of industry, home electric appliances, motor vehicles, and the like, and, more particularly, to a multiple phase claw pole type motor having an improved stator iron core.

(2) Description of Related Art

Claw pole type iron cores are attracting attention which are provided in ordinary rotating electric motors for the purpose of improving the rate of use of magnetic fluxes by increasing a winding factor of windings, as disclosed in JP-A-2003-333777 for example.

In the conventional rotating electric motor having a claw pole type iron core, claw poles of the iron core are formed by laminating a rolled plate and, therefore, can only be obtained in a simple shape. Therefore, the conventional rotating electric motor cannot be obtained as a desirable high-efficiency motor.

BRIEF SUMMARY OF THE INVENTION

An object of the present invention is to provide a multiple phase claw pole type motor with high efficiency having claw poles easily manufacturable.

To achieve the above object, in a multiple phase claw pole type motor having a plurality of claw poles including a claw portion extending in an axial direction and having a magnetic pole surface facing a rotor in a state of being separated from the rotor by a small gap, a radial yoke portion extending radially outwardly and perpendicularly from this claw portion, and an outer peripheral yoke extending from this radial yoke portion in the same direction as the direction of extension of the claw portion, a stator core formed by alternately placing the claw poles in a circumferential direction so that a distal end of each claw portion faces the radial yoke of an adjacent one of the claw poles and having a stator constructed by sandwiching an annular coil with the adjacent claw poles of this stator iron core, the present invention makes the claw poles formed with a magnetic compact having a DC magnetizing property of its flux density becoming 1.7 teslas when 10000 A/m of magnetic field is applied.

The claw pole is formed by compacting a magnetic powder as described above. The claw pole can therefore be formed so as to have a complicated shape. Also, a high-efficiency motor can be obtained by using a magnetic compact having a DC B-H curve of its flux density becoming 1.7 teslas when 10000 A/m of magnetic field is applied.

According to the present invention, as described above, a multiple phase claw pole type high-efficiency motor having claw poles easily manufacturable can be obtained.

Other objects, features, and advantages of the present invention will become clear from the following description of embodiments of the present invention relating to accompanying drawings.

BRIEF DESCRIPTION OF THE SEVERAL VIEWS OF THE DRAWINGS

FIG. 7A is a sectional view showing a main flux and a leakage flux in the claw pole;

FIG. 7B is developed plan view showing a leakage flux in the claw pole;

FIG. 8 is a diagram showing the results of computation of the relationship between the shape of the claw portion of the claw pole and the effective value of the linkage flux using three-dimensional magnetic field analysis;

DETAILED DESCRIPTION OF THE INVENTION

Figure 1:
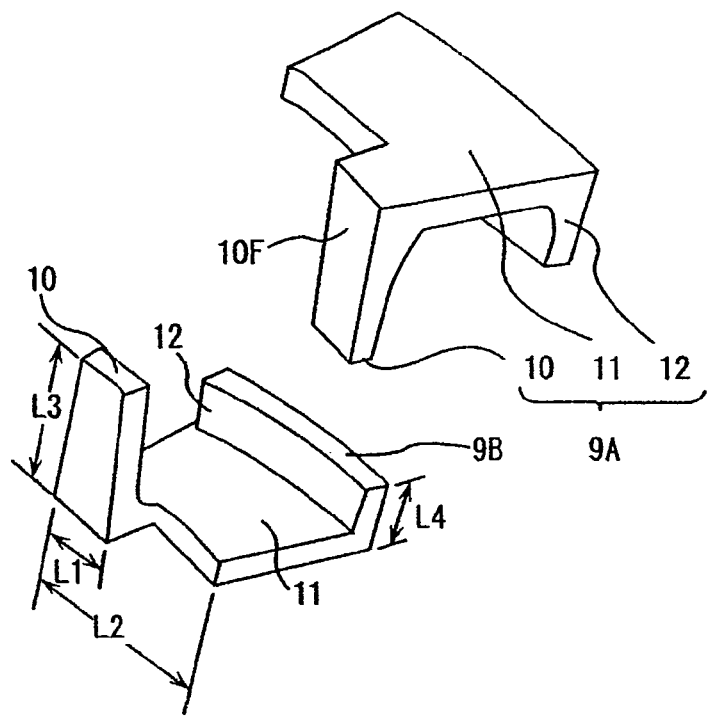
FIG. 1 is an exploded perspective view of a first claw pole and a second claw pole used in a first embodiment of a three-phase claw pole type motor according to the present invention.
Figure 2:
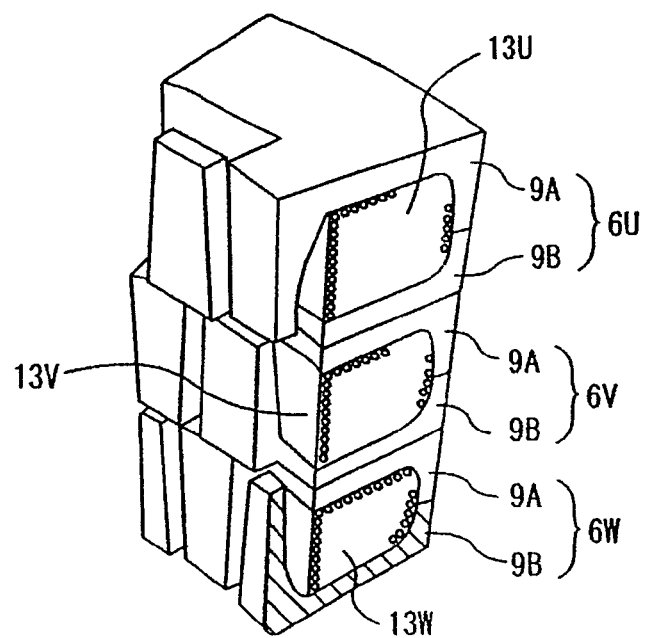
FIG. 2 is a perspective view partly in section of a part of stator iron cores for three phases obtained by assembling the first and second claw poles shown in FIG. 1.
Figure 3:
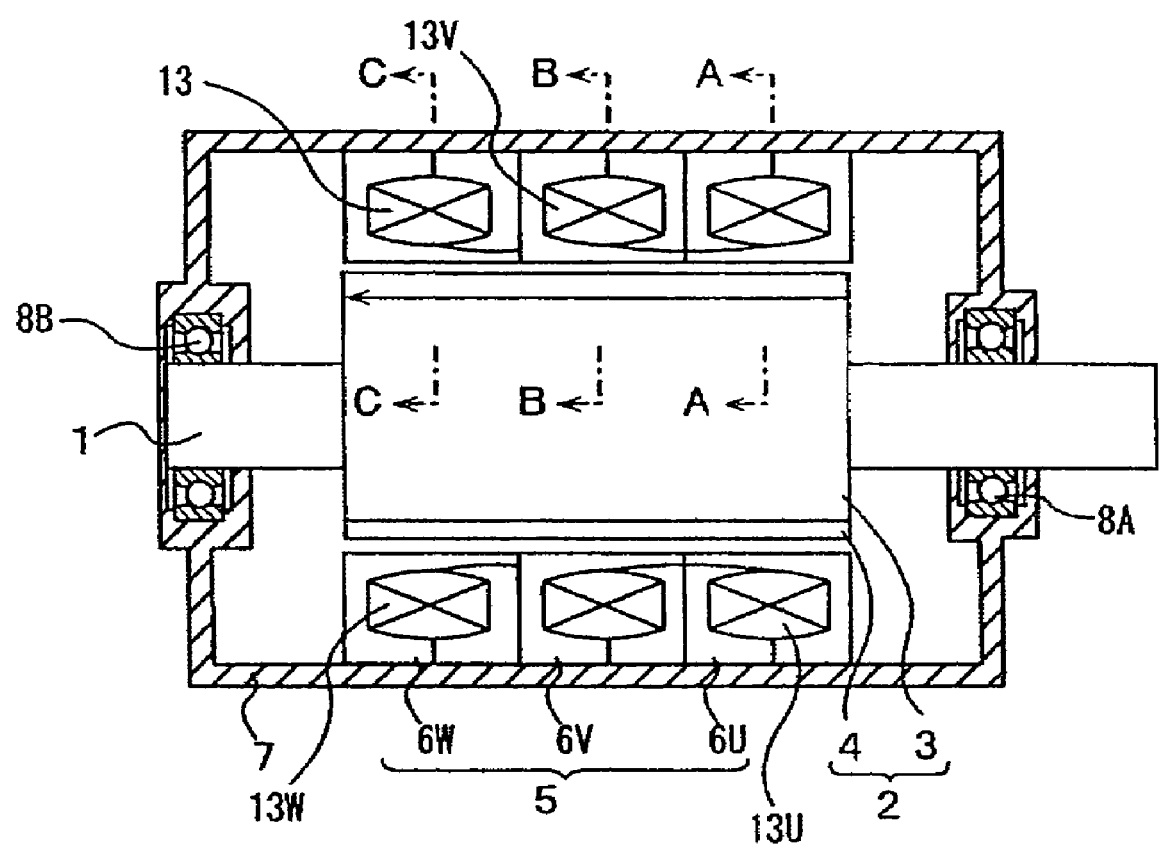
FIG. 3 is a schematic longitudinal sectional view of the entire three-phase claw pole type motor according to the present invention.

Hereafter, a first embodiment of a multiple phase claw pole type motor according to the present invention will be described on the basis of FIGS. 1 to 4.

A three-phase claw pole type motor is constructed by a rotor 2 constructed on a rotating shaft 1, a stator 5 formed concentrically with this rotor 2 in a state of being separated from the same by a small gap formed in a circumferential direction, and a stator frame 7 on which the stator 5 is supported. The rotating shaft 1 is rotatably supported on opposite ends of the stator frame 7 by bearings 8A and 8B.

The rotor 2 is constructed by a rotor iron core 3 formed concentrically with the rotating shaft 1, and a plurality of magnetic poles 4 formed of permanent magnets fixed on the outer periphery of the rotor iron core 3. The stator 5 is constructed by stator iron cores 6U, 6V, and 6W, and annular coils 13 wound on the stator iron cores 6U, 6V, and 6W. The stator iron cores 6U, 6V, and 6W are supported on the stator frame 7, and the rotating shaft 1 is rotatably supported by the bearings 8A and 8B on the opposite ends of the stator frame 7.

Each of the stator iron cores 6U, 6V, and 6W is constructed by a first claw pole 9A and a second claw pole 9B. Each of the first claw pole 9A and the second claw pole 9B is constructed by a claw portion 10 having a magnetic pole surface 10F extending in an axial direction and facing the rotor 2 while being separated from the same by the small gap, a radial yoke portion 11 extending radially outwardly and perpendicularly from the claw portion 10, and an outer peripheral yoke 12 extending from the radial yoke portion 11 in the same direction as the direction of extension of the claw portion 10. Each of the radial yoke portion 11 and the outer peripheral yoke 12 has a circumferential length L2 twice or longer than the circumferential length L1 of the claw portion 10. The claw portion 10 is connected to one side along the circumferential direction of the radial yoke portion 11 having the circumferential length L2. The outer peripheral yoke 12 has an axial length L4 of about ½ of an axial length L3 of the radial yoke portion 11.

The first claw pole 9A and the second claw pole 9B are formed into shapes identical to each other by compacting a magnetic powder in a die. In this way, a complicated magnetic pole structure can be obtained in comparison with those constructed by laminating silicon steel plates.

Figure 4A:
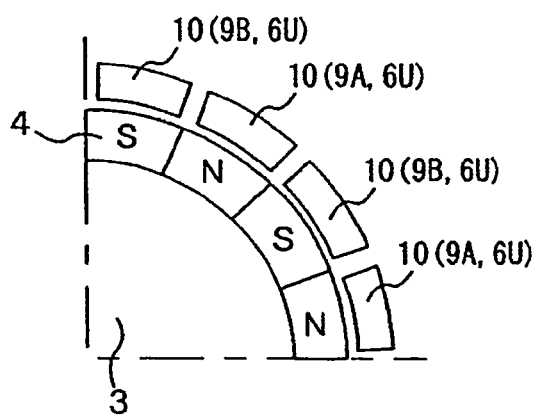
FIG. 4A is a sectional view taken along line A-A in FIG. 3.
Figure 4B:
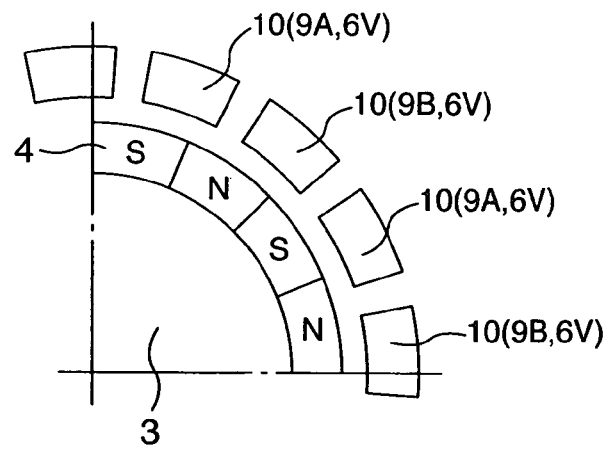
FIG. 4B is a sectional view taken along line B-B in FIG. 3.
Figure 4C:
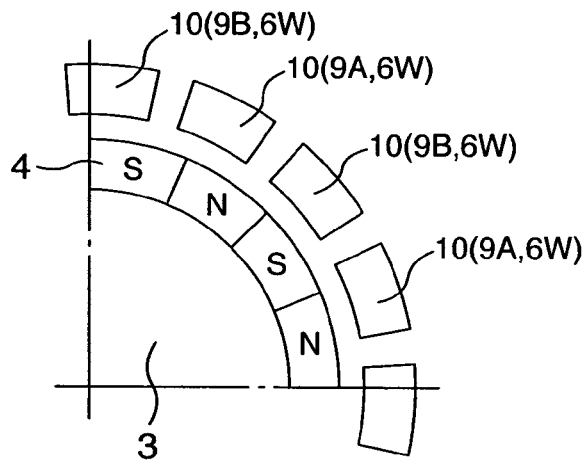
FIG. 4C is a sectional view taken along line C-C in FIG. 3.

The first claw poles 9A and the second claw poles 9B formed as described above are alternately arranged in the circumferential direction so that the end of the claw portion 10 faces the inside diameter side of the radial yoke portion 11 of the adjacent claw pole 9A or 9B, thus forming the stator iron core 6U incorporating the annular coil 13U. The stator iron cores 6V and 6W incorporating the annular coils 13V and 13W are formed in this way and placed by the side of the stator iron core 6U in the axial direction with shifts of 120° in terms of an electrical angle, as shown in FIGS. 4A to 4C, thus constructing the three-phase claw pole type motor having the same number of magnetic poles 4 as the number of claw portions 10, i.e., sixteen magnetic poles 4. These three groups of stator iron cores 6U, 6V, and 6W are encapsulated in a molded insulating resin to obtain the stator 5 in which the first claw poles 9A, the second claw poles 9B, and the annular coils 13U, 13V, and 13W are combined integrally with each other.

Figure 4D:
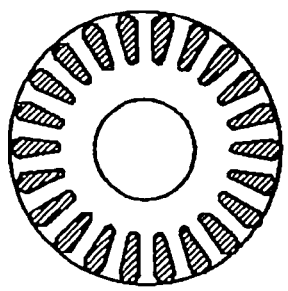
FIG. 4D shows the construction of an inductor type rotor.
Figure 4E:
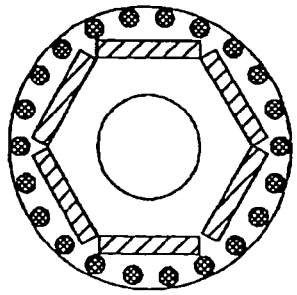
FIG. 4E shows the construction of a rotor having an inductor and magnets.
Figure 4F:
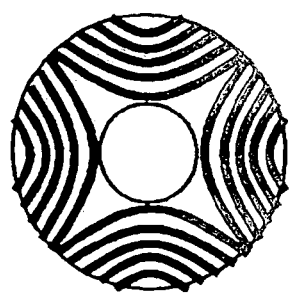
FIG. 4F shows the construction of a salient pole type rotor.

The construction of the rotor 2 is not limited to the construction of arranging the magnets 4 on its surface, but it is possible to obtain running torque so long as the rotor 2 is a rotor, which constructs a pole, such as a rotor which has saliency as shown in FIG. 4F, a cage type inductor shown in FIG. 4D, and a rotor which has magnets and an inductor as shown in FIG. 4E.

As described above, a complicated magnetic pole construction, in other words, a magnetic pole construction capable of improving the motor efficiency can be obtained by forming the first claw poles 9A and the second claw poles 9B by compacting a magnetic powder.

Figure 5A:
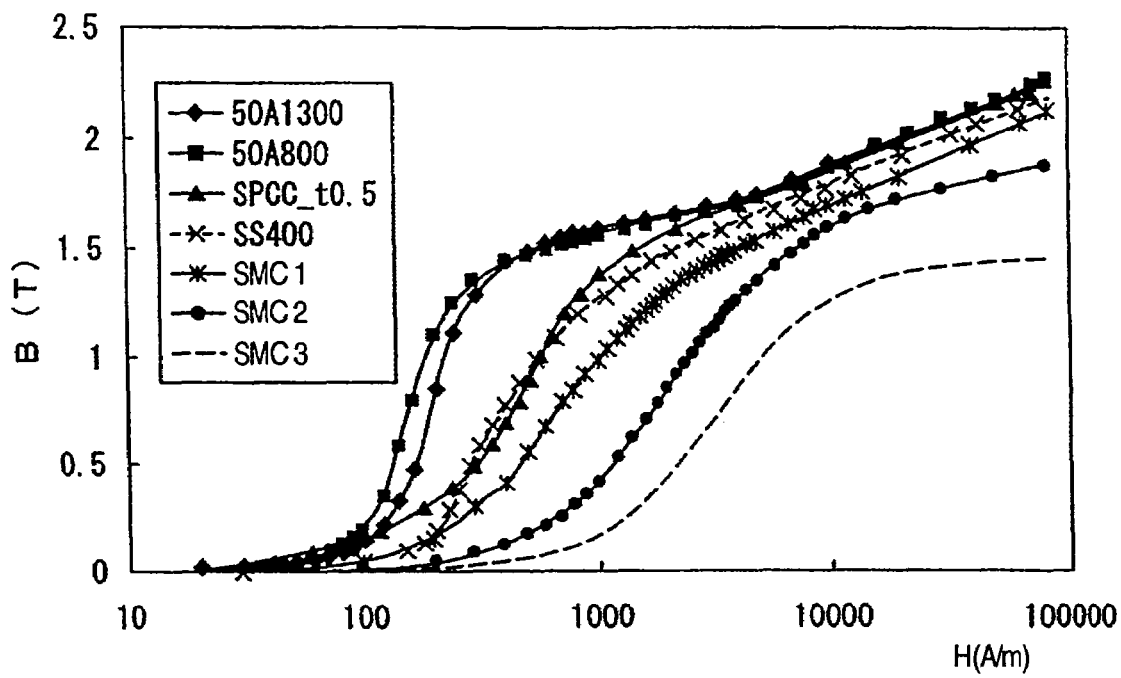
FIG. 5A is a diagram showing B-H curves of various iron core materials.
Figure 5B:
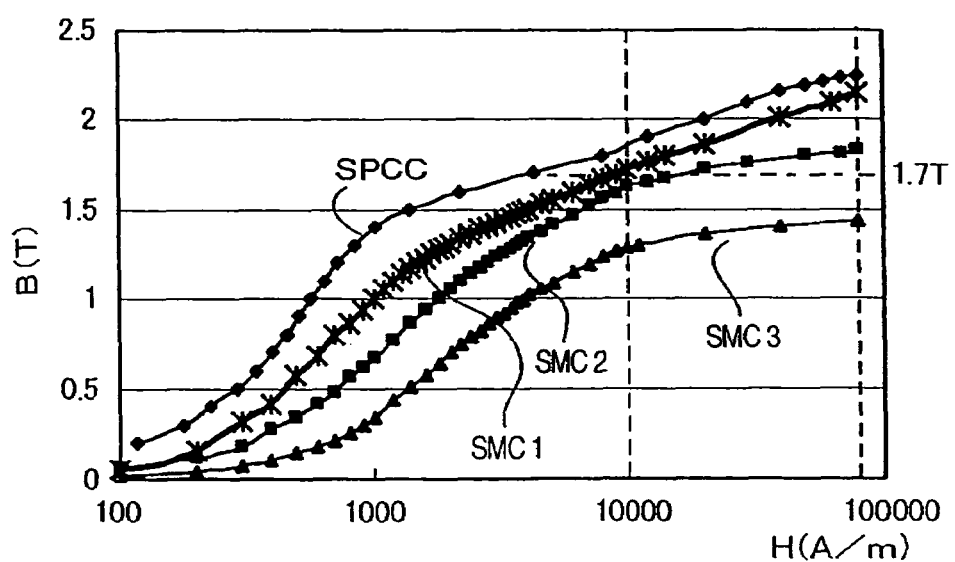
FIG. 5B is a diagram showing B-H curves of various iron core materials.

FIGS. 5A and 5B show the results of measuring the B-H curves of each raw material. This measurement was performed by a ring sample type measuring method (JIS H 7153), and shows DC B-H curves. Iron core bodies formed by compacting a magnetic powder (soft magnetic composites i.e. SMCs 1, 2, and 3) ordinarily have a magnetic permeability lower than that of laminated iron cores formed of a rolled plate (SPCC t0.5, SS400) and laminated iron cores formed of a silicon steel plate(50A1300, 50A800). The maximum flux density of the former is also lower than that of the latter. Further, even if they have the completely same shape, the iron cores (SMCs) formed by compacting a magnetic powder differ in B-H curves by compounding ratios of an iron powder and a resin binder, and the like. As shown in FIG. 5B, the flux density of the SMC 1 obtained when a magnetic field of 10000 A/m is applied to its compact is 1.7 teslas or more, and when 80000 A/m, which is large magnetic field strength is applied, the flux density exceeds 2 teslas. On the other hand, the flux density of the SMC 2 obtained when the magnetic field of 10000 A/m is applied to its compact is 1.6 teslas, and when 80000 A/m, which is large magnetic field strength is applied, the flux density is 1.8 teslas or so. As for an SMC 3, its flux density obtained when the magnetic field of 10000 A/m is applied to its compact is only 1.26 teslas, and when 80000 A/m, which is large magnetic field strength is applied, the flux density is less than 1.5 teslas. It can be expected that the obtained torque of the SMC 3 where the flux density as an SMC is low is also small when it is used in a motor.

Figure 6A:
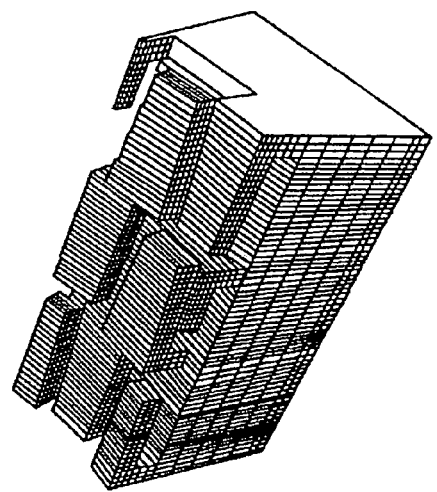
FIG. 6A is a diagram showing a mesh model of the iron core and the results of computation on the various iron core materials using three-dimensional magnetic field analysis.
Figure 6B:
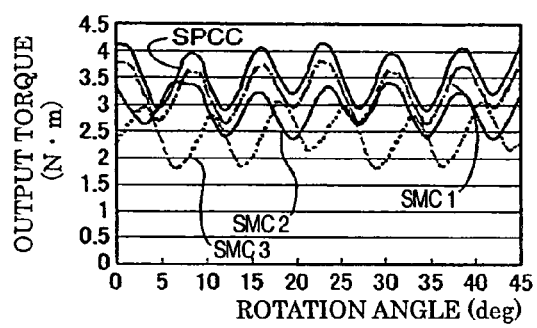
FIG. 6B is a diagram showing the results of calculation of output torque of the motor constructed of various iron core materials.
Figure 6C:
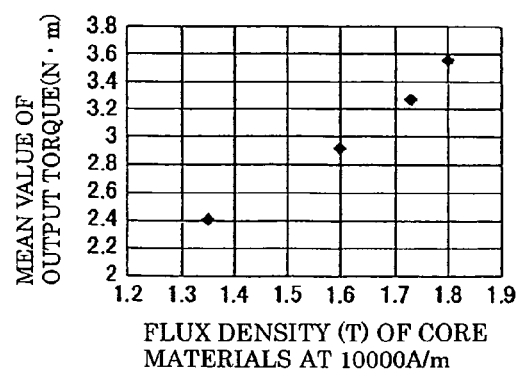
FIG. 6C is a diagram showing the relationship between the flux density and the output torque of the motor, constructed of various iron core materials, at 10000 A/m.

FIGS. 6B to 6E show the results of calculation of the output torque of motors in three-dimensional magnetic field analysis using a finite element method. First, a mesh model is shown in FIG. 6A. In this example, one cycle of electrical angle (equivalent to a machine angle of 45°) of a three-phase claw pole motor with outside diameter size of φ60 mm and 8 poles is modeled. FIG. 6B shows the result of calculation of the output torque, obtained when a current is given to a coil of each phase using this model, using the B-H curves of each material. In the consequence of calculation on the condition that shapes of the motors were completely the same, it was found that, as for the output torque of the motors, the higher a magnetic permeability of a material was, the higher the output torque was. That is, according to the results of calculation with four kinds of materials shown in FIG. 5B, the torque of SPCC is the largest, and the torque of the SMC 3 is the smallest. FIG. 6C shows this relationship with taking the flux density at the time of 10000 A/m as a horizontal axis and taking the output torque as a vertical axis. It was found that the output torque became large in proportion to the flux density.

Figure 6D:
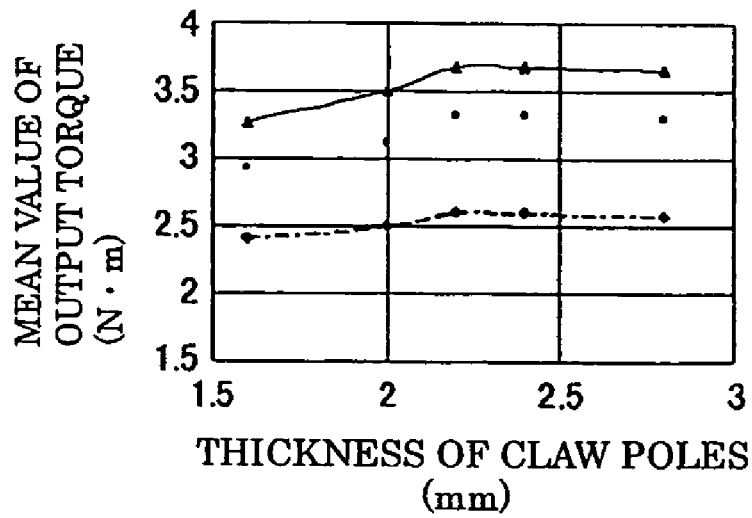
FIG. 6D is a diagram showing the relationship between the claw pole thickness and the output torque of the motor constructed of an SMC (Soft Magnetic Composite)
Figure 6E:
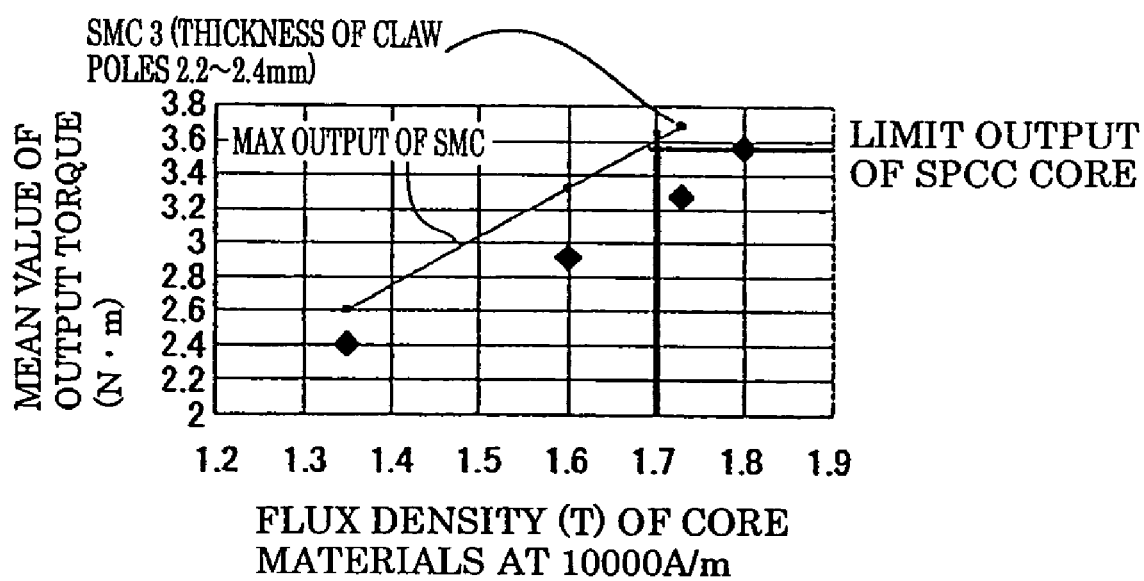
FIG. 6E is a diagram showing the relationship between the flux density and the output torque of the motor, constructed of various iron core materials, at 10000 A/m.

Next, since the SMC can obtain its core shape by compacting, it is possible to employ a pole shape which improves efficiency, as described previously. A specific method is to change pole thickness, which was a limit for SPCC, or the like. FIG. 6D shows the results of calculation with having increased the thickness of the SMC and having performed the same calculation as the above. It becomes clear that, when the thickness of claws of the SMC increases under the same conditions of the field magnets and the motor size, the output torque had an optimal value. FIG. 6E shows the result of plotting with superposing this optimal value on FIG. 6C having been explained previously. It was confirmed that the SMC 1 exceeded the limit torque in the case of construction from SPCC.

Hence, in this embodiment, it is easy to manufacture the claw poles 9A and 9B and is possible to obtain a multiple phase claw pole type motor highly efficient than a conventional iron plate bending type claw pole motor by not only performing the compacting a magnetic powder to form the claw poles 9A and 9B, but also constructing a claw pole stator core of the SMC compact which has DC magnetizing properties of 1.7 teslas or more when a magnetic field of 10000 A/m is applied to the SMC compact.

Figure 22A:
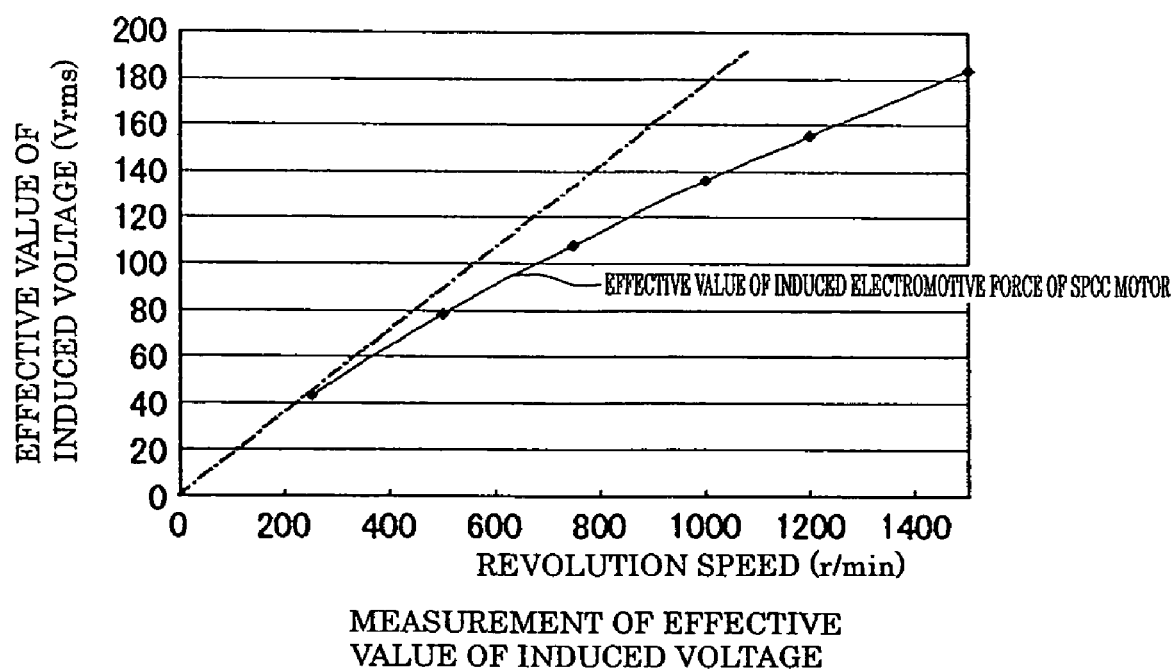
FIG. 22A is a diagram showing the results of measurement of the induced electromotive force of the claw pole type motor using iron plates such as SPCC.
Figure 22B:
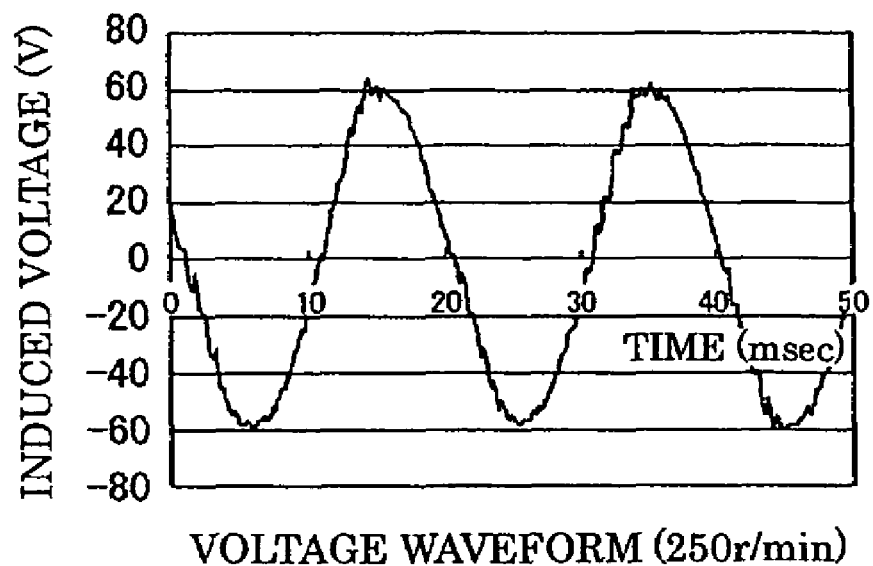
FIG. 22B is a diagram showing an induced voltage waveform at the rotating speed of 250 r/min.
Figure 22C:
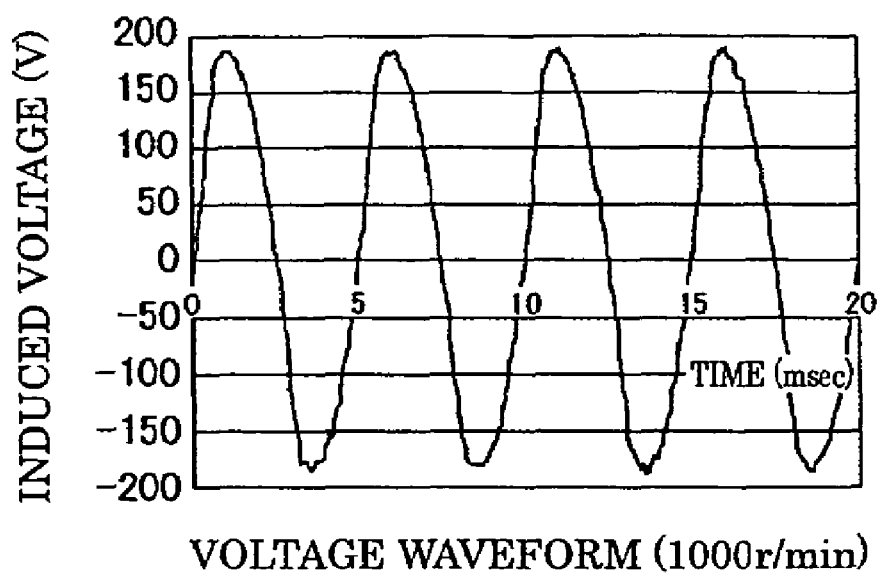
FIG. 22C is a diagram showing an induced voltage waveform at the rotating speed of 1000 r/min.

In addition, since the multiple phase claw pole motor constructed of the SMC core is hardly influenced by an eddy current loss, it is also advantageous to be able to be driven at an RF (radio-frequency). Although the comparison of the output torque in FIG. 5 mentioned above was at low speed (a frequency area with slight influence of an eddy current), properties of the motor constructed of the SMC core will further improve in an RF. FIG. 22A shows the relationship between the revolution speed and the effective value of no-load induced electromotive force. In a claw pole motor constructed from iron plates such as SPCC, when the revolution speed becomes large, an eddy current flows inside the iron plates in a direction of obstructing magnetic fluxes. Then, owing to a denial operation of the magnetic fluxes by the current, a waveform of the induced electromotive force is distorted as shown in FIG. 22B, and an effective value becomes small. On the other hand, in the claw pole motor whose core is constructed of the SMC, since an eddy current hardly flows, it becomes an effective value of the induced electromotive force linear to a frequency (revolution speed). Hence, although the conventional claw pole type motor with the conventional claw poles could not be used for an application at high revolution speed, the claw pole motor constructed of the SMC core can be driven at high revolution speed (high frequency area).

In addition, because the eddy current hardly flows it is also possible to correspond to a PWM method of control system which performs a pulse division of a sinusoidal voltage and driving. PWM is a drive system of obtaining an effective value of a voltage in a pulse-like voltage. Since a switching frequency of those pulses is usually about 10 times of a maximum frequency of a drive current of a motor, that is, a very high frequency, an eddy current arises by its RF component. Hence, since iron loss becomes large in a conventional claw pole motor constructed from iron plates, the motor has become an inefficient motor. Since the eddy current hardly flows, the claw pole type motor of the present invention which is constructed of the SMC core can be driven.

On the other hand, large torque pulsation occurs in the case of use of the iron core formed by compacting a magnetic powder, such that the magnitude of pulsation is ⅓ of the average torque. The cause of this torque pulsation is a large distortion in the waveforms of voltages induced in the annular coils 13U to 13W by local magnetic saturation in the claw poles 9A and 9B. Such a waveform distortion is also caused by an interpole leakage flux or an in-pole leakage flux.

These leakage magnetic fluxes will be described with reference to FIGS. 7A and 7B. FIG. 7A shows a flow of a main flux Φ. The main flux Φ emerging from one N magnetic pole in the magnetic poles 4, for example, enters the claw portion 10 of the first claw pole 9A through a gap, enters the claw portion 10 of the second claw pole 9B from the claw portion 10 of the first claw pole 9A in linkage to the annular coil 13, and enters the S magnetic pole 4 from the claw portion 10 of the second claw pole 9B through the gap, thus forming a magnetic path returning to the N magnetic pole 4. Apart from the main flux Φ, an interpole leakage flux Φ1 exists. If the interpole size SO between the claw portions 10 of the first and second claw poles 9A and 9B is smaller than the gap size between the magnetic poles 4 and the claw portions 10, the interpole leakage flux Φ1 forms a magnetic path by shortcutting between the claw portions 10 without linkage to the annular coil 13, resulting in reduction in a rate of use of the magnetomotive force of the magnetic poles 4 formed of permanent magnets. The interpole size SO between the claw portions 10 may be increased by considering this phenomenon. However, if the interpole size SO is increased, the width of the magnetic pole surface 10F is so small that the effective value of the linkage flux of linkage between the main flux Φ and the annular coil 13 is considerably reduced. It is not advisable to adopt such an easy way of increasing the interpole size SO.

Further, the generation of an in-pole leakage flux Φ2 is a phenomenon in which, as shown in FIG. 7B, part of the main flux Φ entering the claw portion 10 of the first claw pole 9A enters the radial yoke portion 11 of the adjacent second claw pole 9B facing the first claw pole 9A from the distal end of the first claw pole 9A by forming the in-pole leakage flux Φ2, and flows in the radial yoke portion 11 in the circumferential direction to form a magnetic path reaching the claw portion 10 of the second claw pole 9B. To reduce this in-pole leakage flux Φ2, a sectional area of the distal end of the claw portion 10 may be reduced by increasing the angle θk of the magnetic pole surface 10F or the gap d1 between the distal end of the claw portion 10 and the radial yoke portion 11 may be increased. These measures to reduce the in-pole leakage flux Φ2 entails the drawback of reducing the area of the magnetic pole surface 10F and thereby reducing the effective value of the linkage flux as in the above-described case. It is not advisable to adopt these measures.

FIG. 8 shows the results of computation of the relationship between the interpole size SO and the effective value of the linkage flux using the above-mentioned three-dimensional magnetic field analysis.

As is apparent from FIG. 8, the effective value of the linkage flux can be increased by increasing the angle θk of the magnetic pole surface 10F and by reducing the interpole size SO of the adjacent claw portions 10. However, if the effective value of the linkage flux is increased, the leakage fluxes (Φ1, Φ2) are also increased to cause an increase in distortion of the waveform of the induced voltage, as described above.

Figure 9:
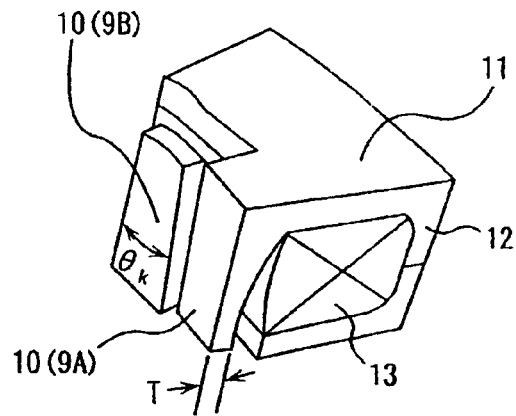
FIG. 9 is a perspective view partly in section of a second embodiment of the three-phase claw pole type motor according to the present invention.

A second embodiment of the three-phase claw pole type motor in accordance with the present invention arranged to solve the above-described problem due to the leakage fluxes (Φ1, Φ2) and capable of maintaining a high effective value of the linkage flux will be described with reference to FIG. 9. In FIG. 9, the same reference characters as those in the figure showing the first embodiment indicate the same component parts. The description of the same component parts will not be repeated.

In this embodiment, the angle θk of the magnetic pole surface 10F is increased and the thickness T of the claw portion 10 is increased. Also, the thickness T is gradually increased along a direction from the distal end of the claw portion 10 toward the radial yoke portion 11.

If the sectional area of the claw portion 10 is increased as described above, a high effective value of the linkage flux can be maintained. Also, local magnetic saturation regions in the first and second claw poles 9A and 9B can be reduced. As a result, the leakage fluxes (Φ1, Φ2) are limited even if the interpole size SO is reduced by increasing the angle θk of the magnetic pole surface 10F. Therefore, distortion in the waveform of the induced voltage can be reduced and torque pulsation can be limited.

Figure 10:
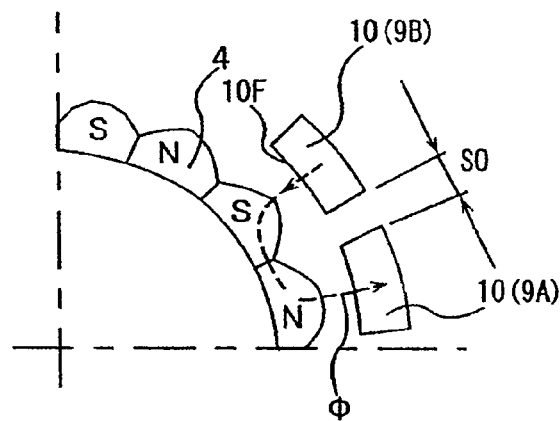
FIG. 10 is a sectional view partly in section of a third embodiment of the three-phase claw pole type motor according to the present invention.

FIG. 10 shows a third embodiment of the three-phase claw pole type motor in accordance with the present invention. The third embodiment differs from the first embodiment in the sectional shape of the magnetic pole 4 in the rotor side.

That is, in this embodiment, the magnetic pole 4 is formed so as to have a sectional shape with a convex curve such that a central portion in the circumferential direction is closest to the claw portion 10 while opposite end portions in the circumferential direction are remotest from the claw portion 10.

If a curved surface defined by such a convex curve is formed on the magnetic pole 4, the main flux Φ can be made to flow concentrically from a center of the curved surface into the claw portion 10. Also, the resistance of the magnetic flux path for the interpole leakage flux Φ1 flowing in the claw portions 10 through the opposite end portions of the magnetic pole 4 in the circumferential direction as shown in FIG. 7A is increased by increasing the gap between the magnetic pole 4 and the claw portion 10, thereby reducing the amount of leakage of this flux. As a result, the interpole leakage flux Φ1 can be reduced without reducing the effective value of the linkage flux.

Figure 11:
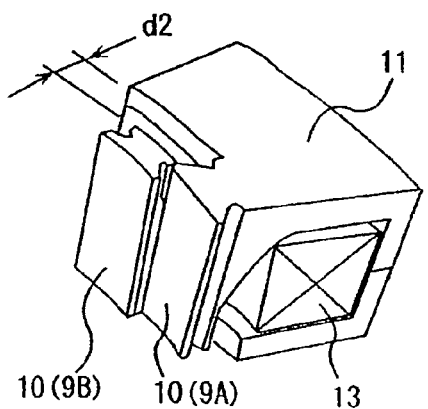
FIG. 11 is a perspective view partly in section of a fourth embodiment of the three-phase claw pole type motor according to the present invention.
Figure 12:
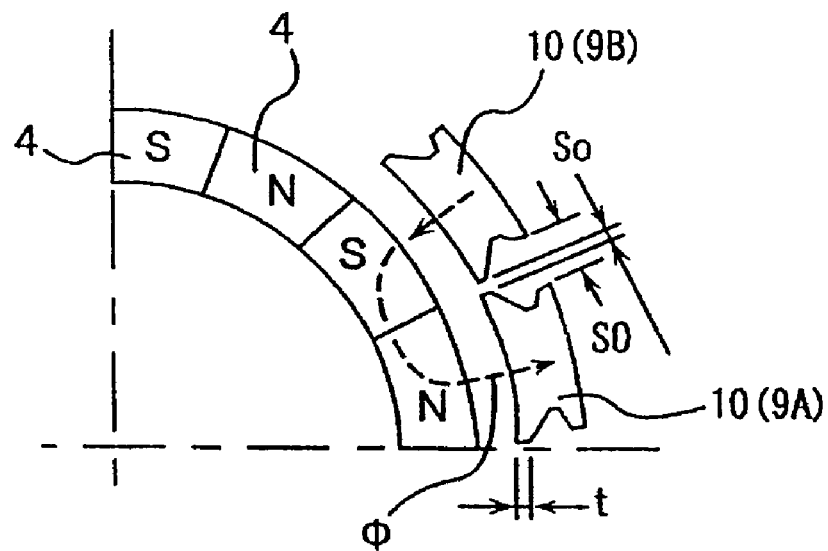
FIG. 12 is a sectional view partly in section showing the relationship between the magnetic poles and the claw poles shown in FIG. 11.

A fourth embodiment of the three-phase claw pole type motor in accordance with the present invention in which the shape of the claw portion 10 is changed to reduce a leakage flux will be described with reference to FIGS. 11 and 12.

The area of the magnetic pole surface 10F of the claw portion 10 facing the magnetic pole 4 is increased to ensure a high effective value of the linkage flux. The area of the magnetic pole surface 10F is increased by reducing the angle θk in the construction shown in FIG. 1 so that the sides defining the angle θk are parallel to the axial direction. Also, the interpole size SO between the claw portions 10 of each adjacent pair of the first and second claw poles 9A and 9B is increased relative to the gap between the claw portions 10 and the magnetic poles 4, but the interpole size So between portions of the claw portions 10 having a thickness t in the magnetic pole 4 side is reduced.

If the claw portions 10 are formed in this manner, the flow of the interpole leakage flux Φ1 into the portions having the thickness t, between which the magnetic path between the claw portions 10 is restricted, is limited, thereby reducing the interpole leakage flux Φ1.

To reduce the in-pole leakage flux Φ2, the gap d2 between the distal end of the claw portion 10 and the radial yoke portion 11 of the adjacent claw pole 9A (or 9B) may be increased.

Figure 13:
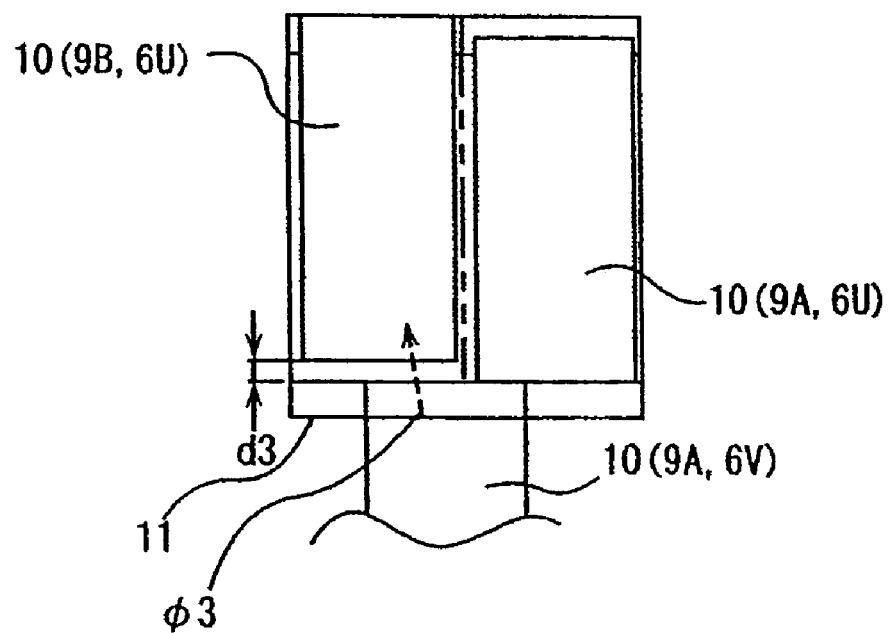
FIG. 13 is an exploded plan view showing an example of modification of the fourth embodiment.

A leakage flux Φ3 between adjacent pair of phases can be reduced, for example, by setting the gap d3 between the distal end of the claw portion 10 in the U-phase side and the radial yoke portion 11 of the adjacent claw pole 9A in the V-phase side to an increased value, as shown in FIG. 13.

Figure 14:
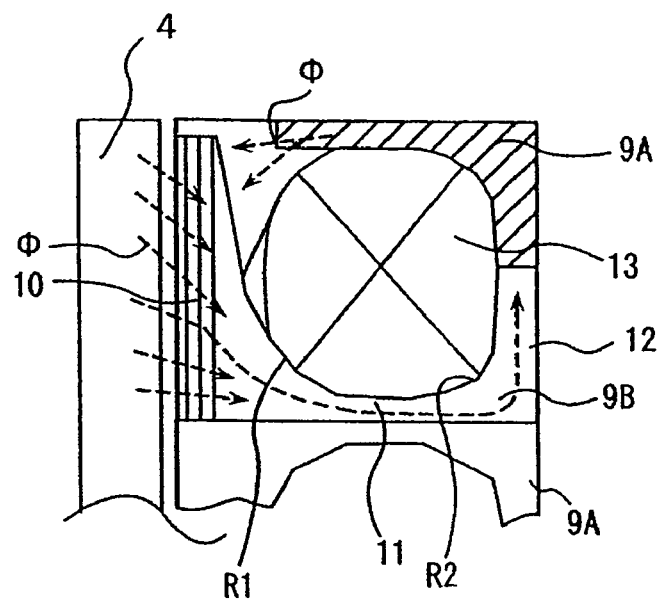
FIG. 14 is an enlarged view partly in section of a fifth embodiment of the three-phase claw pole type motor according to the present invention.

FIG. 14 shows a fifth embodiment of the three-phase claw pole type motor in accordance with the present invention.

In this embodiment, to enable the main flux Φ to flow through the shortest distance, concave portions R1 and R2 formed of polygonal surfaces are respectively formed as an inner corner portion in the connecting portion between the claw pole 9A or 9B and the radial yoke portion 11 and an inner corner portion in the connecting portion between the radial yoke portion 11 and the outer peripheral yoke 12. The concave portions R1 and R2 are formed by connecting a certain number of surfaces at certain angles. They may alternatively be formed of one curved surface or a certain number of curved surfaces.

A sixth embodiment of the three-phase claw pole type motor in accordance with the present invention will be described with reference to FIG. 15. The same basic construction for increasing the effective value of the linkage flux between the first claw pole 9A and the second claw pole 9B and reducing leakage fluxes as that in each of the above-described embodiments is also used in this embodiment. The description of the basic construction will not be repeated.

A three-dimensional shape can be integrally formed since the first claw pole 9A and the second claw pole 9B constructing each of stator cores 6U, 6V, and 6W are formed by compacting a magnetic powder, as described above. Since the first claw pole 9A and the second claw pole 9B are formed so as to be identical in shape to each other, it is desirable to attach marks used as a reference at the time of assembly to the first and second claw poles 9A and 9B. Further, it is advantageous to provide a positioning function or an assembly guide function by forming the marks. Such a function is effective in improving the facility with which the component parts are assembled and reducing the assembly time.

To provide such a function in this embodiment, recesses 14 and projections 15 capable of engaging with the recesses 14 are formed in the outer peripheral yoke 12 constructing the first claw pole 9A and the second claw pole 9B. The recesses 14 and the projections 15 are formed in the first and second claw poles 9A and 9B by being recessed and raised along the axial direction so as to be capable of fitting to each other when the first and second claw poles 9A and 9B are brought into abutment on each other. A recessed groove 14 and a projection 15 are formed at positions distanced by 180° in terms of electrical angle in the circumferential direction. Since the first and second claw poles 9A and 9B are perfectly identical in shape to each other, they can be compacted in one die.

When the first and second claw poles 9A and 9B constructed as described above are assembled, they are fitted to each other by simply moving the projections 15 into the recesses 14 in the axial direction, with the annular coil 13 interposed between the claw portions 10 and the radial yoke portions 11. Thus, the assembly can be easily completed.

Figure 16:
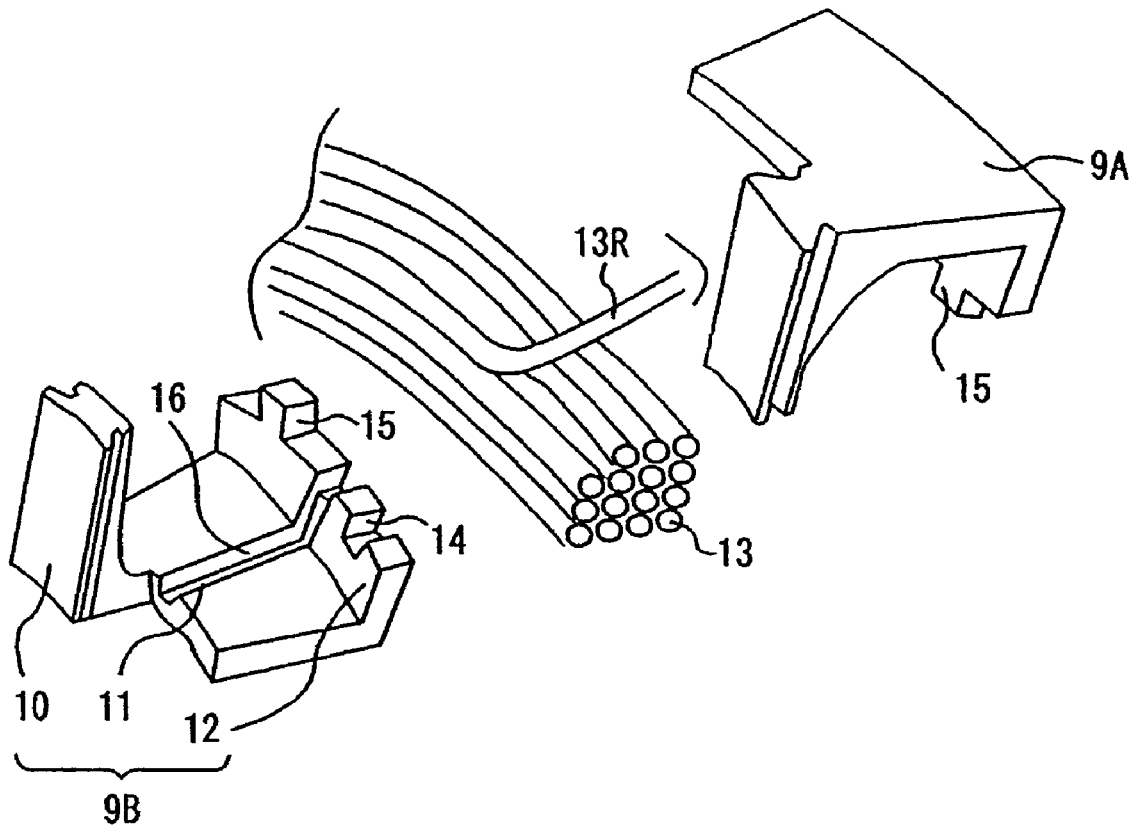
FIG. 16 is a partly exploded perspective view showing an example of modification of the sixth embodiment.

FIG. 16 shows an example of modification of the sixth embodiment. A lead wire channel 16 through which a lead wire 13R corresponding to a winding-leading end and/or a wiring-trailing end of the annular coils 13 is laid to the outside is formed by integral compacting in each of the surfaces of the radial yoke portions 11 of the first and second claw poles 9A and 9B facing the annular coil 13.

If the lead wire channel 16 is formed in the radial yoke portion 11 in advance, the need for provision of an additional space for the lead wire 13R is eliminated, thereby increasing the winding density of the annular coil 13 and enabling lead wires 13R in the entire motor to be laid in a determined direction.

Figure 17:
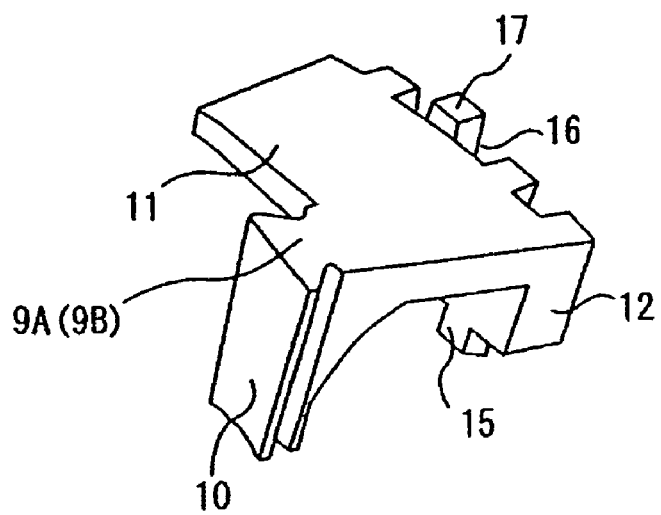
FIG. 17 is a perspective view of a claw iron core of a seventh embodiment of the three-phase claw pole type motor according to the present invention.

While the facility with which the first and second claw poles 9A and 9B in the in-phase relationship are assembled is improved in the above-described sixth embodiment, an improvement in the facility with which the first and second claw poles 9A and 9B in an interphase relationship are assembled can be achieved in a seventh embodiment shown in FIG. 17.

Figure 15:
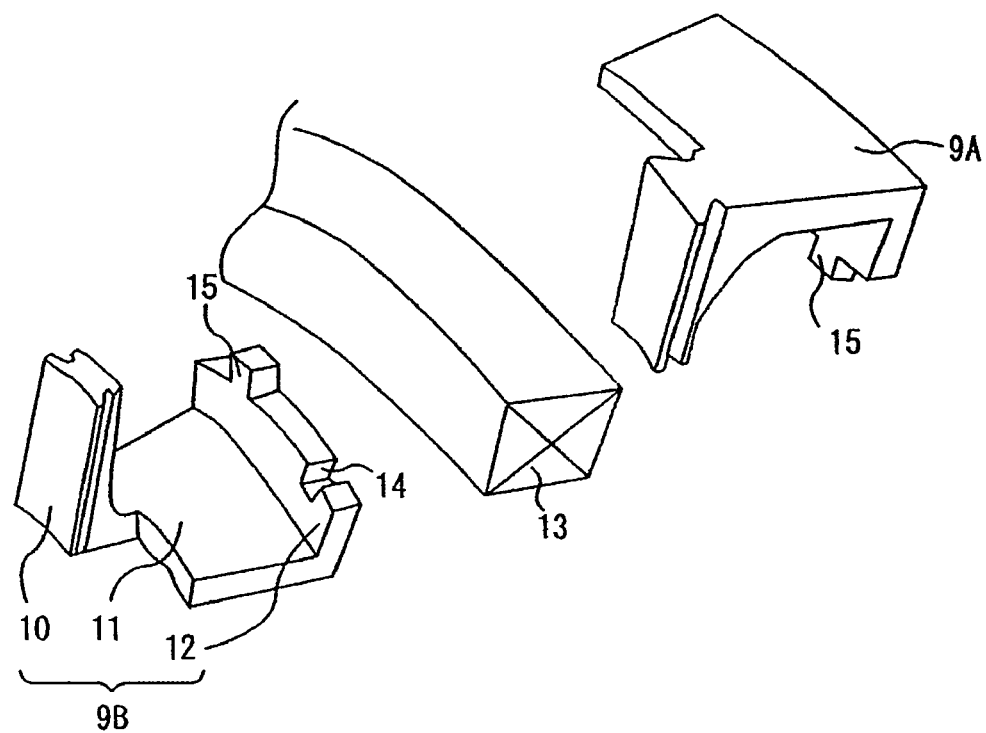
FIG. 15 is a partly exploded perspective view of a sixth embodiment of the three-phase claw pole type motor according to the present invention.

That is, a recess 16 and a projection 17 are formed in the radial yoke portion 11 side in the outer peripheral yokes 12 of the first and second claw poles 9A and 9B in an interphase relationship by being placed side by side in the circumferential direction, in addition to the recess 14 and the projection 15 shown in FIG. 15. Recesses 16 each capable of being fitted to one projection 17 provided at least in one place are formed at positions distanced by ±60° and ±120° in terms of electrical angle from the position of the projection 17, thereby enabling the outer peripheral yokes 12 of the first and second claw poles 9A and 9B in interphase relationship to be positioned relative to each other with accuracy as well as facilitating the assembly.

Figure 18:
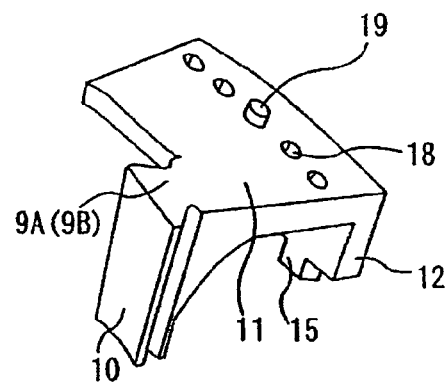
FIG. 18 is a perspective view of a claw iron core of an eighth embodiment of the multiple phase claw pole type motor according to the present invention.

FIG. 18 shows an eighth embodiment of the multiple phase claw pole type motor in accordance with the present invention. Fitting holes 18 and a fitting projection 19 arranged in the axial direction are formed in the outer peripheral yokes 12 of the first and second claw poles 9A and 9B in interphase relationship, as are the projection and the recesses in the sixth embodiment. Also in this case, the same effect as that in the sixth embodiment is achieved.

Figure 19:
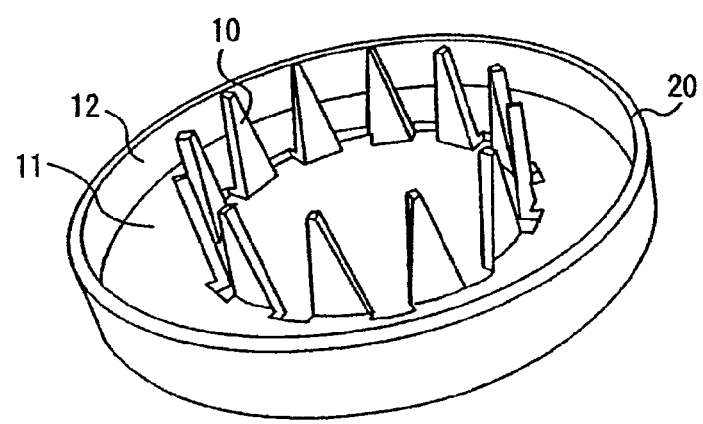
FIG. 19 is a perspective view showing an example of modification of claw poles.
Figure 20:
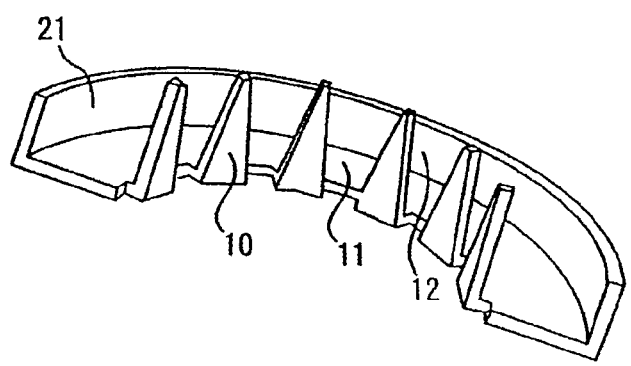
FIG. 20 is a perspective view showing another example of modification of claw poles.
Figure 21:
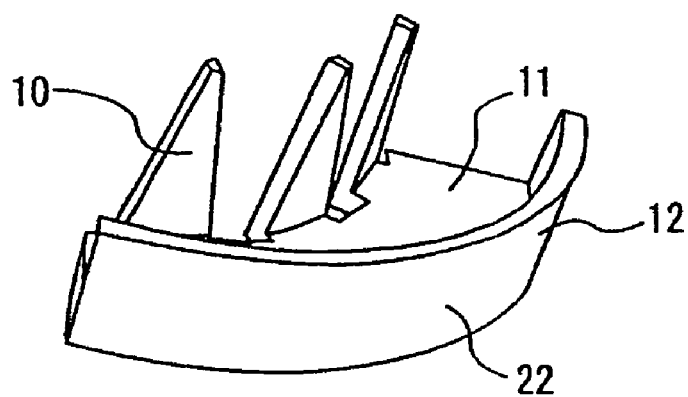
FIG. 21 is a perspective view showing still another example of modification of claw poles.

In each of the above-described embodiments, the first and second claw poles 9A and 9B are formed in correspondence with each pole. However, needless to say, a claw pole assembly 20 in which claw pole portions for one phase (360°) are formed integrally with each other as shown in FIG. 19, a claw pole assembly 21 in which claw pole portions for ½ phase (180°) are formed integrally with each other as shown in FIG. 20 and a claw pole assembly 22 in which claw pole portions for ¼ phase (90°) are formed integrally with each other as shown in FIG. 21 may be formed. In such case, the relationship between the positions at which the recesses 14 or 16 and the projections 15 or 17 are provided and the relationship between the positions at which the fitting holes 18 and the fitting projections 19 are provided may be angular relationships of integer multiples of ±60° and ±120° in terms of electrical angle.

Although the above-mentioned description was made about embodiments, the present invention is not limited to them, but it is apparent to those skilled in the art that various changes and modifications can be made within the scope of the spirit of the present invention, and the attached claims.

The invention claimed is:

1. A multiple phase claw pole type motor comprising:
   a rotor;
   a U-phase stator core, a V-phase stator core and a W-phase stator core, wherein
   each of the U, V and W-phase stator cores includes a plurality of claw poles each including:
      a claw portion extending in an axial direction and having a magnetic pole surface facing the rotor in a state of being separated from the rotor by a gap,
      a radial yoke portion extending radially outwardly from the claw portion, and
      an outer peripheral yoke extending from this radial yoke portion in the same direction of extension of the claw portion;
   wherein each of the U, V and W-phase stator cores is formed by alternately placing the claw poles in a circumferential direction so that a distal end of each claw portion is adjacent to the radial yoke of a radially adjacent claw pole; and
   wherein each of the U, V and W-phase stator cores is constructed by sandwiching an annular coil with the adjacent claw poles of the stator core, wherein:
   the claw poles are formed by compacting a magnetic powder to form a magnetic compact having a DC magnetizing property of its flux density becoming 1.7 teslas or more when 10000 A/m of magnetic field is applied, and
   the respective claw portions of the U, V and W-phase stator cores are superposed relative to each other so that the magnetic surfaces facing the rotor of the respective claw portions of the U, V and W-phase stator cores are arranged in the axial direction relative to one another,
   wherein the annular coil and the plurality of claw poles are unified by being encapsulated together in resin molding after the annular coil is wound.

2. The multiple phase claw pole type motor according to claim 1, wherein, in each of the U, V and W-phase stator cores, two pairs of the claw poles are formed axially so as to be identical in shape.

3. The multiple phase claw pole type motor according to claim 1, wherein, each of the U, V and W-phase stator cores, inner corner portions between the claw portion of the claw pole and the radical yoke portion, and between the radical yoke portion and the outer periphery yoke are formed in a concave portion and are constructed of polygonal surfaces.

4. The multiple phase claw pole type motor according to claim 1, wherein a portion of each claw pole facing an adjacent one of the claw poles is parallel to an axial direction.

5. The multiple phase claw pole type motor according to claim 1, wherein, in each of the U, V and W-phase stator cores, each of the claw poles has a fitting portion for positioning in an opposite portion to an adjacent one of the claw poles.

6. The multiple phase claw pole type motor according to claim 1, wherein, in each of the U, V and W-phase stator cores, the claw portion is formed so that its radial thickness increases gradually toward the radial yoke portion from a distal end.

7. The multiple phase claw pole type motor according to claim 1, wherein the rotor comprises a plurality of permanent magnets facing magnetic pole surfaces of the claw poles, in a circumferential direction; and
   wherein the permanent magnets are formed so that gaps between with the magnetic pole surfaces become narrow in their center portions and wide in both sides in a circumferential direction.

8. The multiple phase claw pole type motor according to claim 1, wherein the claw poles are constructed with being divided every one pole or every two or more poles.

9. The multiple phase claw pole type motor according to claim 1, wherein the rotor is a rotor which is a salient pole type, a rotor which has a cage type inductor, or a rotor which has both of a cage type inductor and magnets.

10. The multiple phase claw pole type motor according to claim 1, wherein the motor is adapted to be driven by PWM (Pulse Width Modulation) control.

11. A claw pole type motor according to claim 1,
   wherein individual magnets formed on said motor are each common to all of the U-phase stator core, the V-phase stator core and the W-phase stator core.

12. A claw pole type motor according to claim 1, wherein the plurality of claw poles includes recesses, and projections formed on the outer peripheral yoke.

* * * * *